US008930452B2

(12) United States Patent
Baalu et al.

(10) Patent No.: US 8,930,452 B2
(45) Date of Patent: Jan. 6, 2015

(54) SYSTEM AND METHOD FOR AUTOMATICALLY POSTING USER-LOCATION INFORMATION TO A SOCIAL NETWORK

(75) Inventors: Arvin Baalu, Bangalore (IN); Dibyendu Chatterjee, Bangalore (IN); Ramana Rao, Bangalore (IN)

(73) Assignee: Harman International Industries, Incorporated, Northridge, CA (US)

( * ) Notice: Subject to any disclaimer, the term of this patent is extended or adjusted under 35 U.S.C. 154(b) by 160 days.

(21) Appl. No.: 13/227,278

(22) Filed: Sep. 7, 2011

(65) Prior Publication Data

US 2012/0158845 A1 Jun. 21, 2012

Related U.S. Application Data

(63) Continuation-in-part of application No. 12/973,054, filed on Dec. 20, 2010, now abandoned.

(51) Int. Cl.
| | |
|---|---|
| G06F 15/16 | (2006.01) |
| G06Q 30/02 | (2012.01) |
| H04W 4/02 | (2009.01) |
| H04W 4/18 | (2009.01) |
| H04W 4/20 | (2009.01) |

(52) U.S. Cl.
CPC .............. *G06Q 30/02* (2013.01); *H04W 4/02* (2013.01); *H04W 4/185* (2013.01); *H04W 4/206* (2013.01)
USPC ...................................................... 709/204

(58) Field of Classification Search
USPC ...................................................... 709/204
See application file for complete search history.

(56) References Cited

U.S. PATENT DOCUMENTS

| | | | | |
|---|---|---|---|---|
| 6,360,167 | B1 * | 3/2002 | Millington et al. | 701/516 |
| 6,542,814 | B2 * | 4/2003 | Polidi et al. | 701/454 |
| 8,014,943 | B2 * | 9/2011 | Jakobson | 701/439 |
| 2008/0070593 | A1 * | 3/2008 | Altman et al. | 455/457 |
| 2008/0132252 | A1 * | 6/2008 | Altman et al. | 455/457 |
| 2009/0005076 | A1 * | 1/2009 | Forstall et al. | 455/456.2 |
| 2011/0173072 | A1 * | 7/2011 | Ross et al. | 705/14.57 |
| 2012/0089689 | A1 * | 4/2012 | Tan | 709/206 |

OTHER PUBLICATIONS

European Search Report No. EP 11 19 4662, dated Feb. 29, 2012, 7 pages.
Schreiner, Keri; "Where We At? Mobile Phones Bring GPS to the Masses"; IEEE Computer Graphics and Applications, IEEE Service Center, New York, NY, US; vol. 27, No. 3, 1 May 2.
Mobilaris: Find Your Buddy is a Social Networking application; Jun. 7, 2007; pp. 1-3.

* cited by examiner

*Primary Examiner* — Yves Dalencourt
(74) *Attorney, Agent, or Firm* — Alleman Hall McCoy Russell & Tuttle LLP (57) ABSTRACT

Methods and systems for automatically interfacing with Internet-based social networks for safely providing friends of a mobile user with location updates. In particular, a system and method are provided for automatically posting user-location information to a social network. A system interface receives user data including a location update activation indicator and location update conditions. A navigation engine obtains information associated with the current location of the mobile user. A social network client module of the system is configured to determine that the location activation indicator is active and to determine that a location update condition is met. A communications interface automatically posts a location update to the social network if the social network client determines that at least one location update condition is met.

34 Claims, 7 Drawing Sheets

SYSTEM AND METHOD FOR AUTOMATICALLY POSTING USER-LOCATION INFORMATION TO A SOCIAL NETWORK

CROSS-REFERENCE TO RELATED APPLICATIONS

This application is a continuation-in-part and claims the priority benefit of U.S. patent application Ser. No. 12/973,054 filed Dec. 20, 2010, entitled "Location Aware Social Networking," which application is hereby incorporated in its entirety by reference.

FIELD

This disclosure generally relates to social networking. More specifically, this disclosure relates to Internet-based social networking using location-aware mobile systems.

BACKGROUND

Internet-based social networking has become a ubiquitous part of day-to-day life for people around the world. Websites like Facebook™, Twitter™, Bebo™, Orkut™ and Qzone™ are regularly used by hundreds of millions of people. Each of these sites, and others, allows people to connect to each other within the site, typically based on some common or shared bond, such as being friends, coworkers, classmates, relatives, or through sharing some common interest, like music, sports, religion, hobbies, etc., or simple curiosity. For the purposes of this application, the generic terms "friend" or "friends" will be used to indicate one or more interconnected users within a particular Internet-based social networking website, and the generic terms "social network" or "social networks" will be used as a placeholder for any such Internet-based social networking website.

In at least some social networks, it is possible for a user to manually input or post a location of where that user is currently located, or where that user may be going, so as to inform or update friends, albeit in a non-real-time, manually manner. However there is no way, or at least no safe way, for a user who is mobile, e.g., while driving, biking or walking on busy streets, to safely provide real-time updates or posts. Thus, there is a mobile user need to have equipment or systems that are capable of directly interfacing with Internet-based social networks for safely providing friends with location-aware updates.

SUMMARY

In certain examples, a computer-implemented method of automatically posting user-location information to a social network is provided. In the method, user data including a location update activation indicator and one or more location update conditions is received. Determining that the location update activation indicator is active is performed. Location information associated with a location of a mobile user is obtained. A determination is made that at least one location update condition is met and a location update is automatically posted to the social network if at least one location update condition is met.

In certain examples, a system for automatically posting user-location information to a social network is provided. A system interface receives user data including a location update activation indicator and one or more location update conditions. A navigation engine obtains information associated with a location of a mobile user. A social network client coupled with the navigation engine determines that the location update activator is active and is adapted to determine that at least one location update condition is met. A communications interface coupled with the navigation engine and the social network client is adapted to automatically post a location update to the social network if the social network client determines that at least one update condition is met.

BRIEF DESCRIPTION OF THE DRAWINGS

Aspects and features of this application will become apparent to those of ordinary skill in the art after learning the teachings of the detailed description, together with the following drawings.

DETAILED DESCRIPTION

Reference is now made to certain implementations, examples of which are illustrated in the accompanying drawings. For clarity, corresponding features are consistently labeled across the various views provided in the figures. It will become apparent to those skilled in the art upon learning from this disclosure that many similar designs, combinations and packages are possible. All of these designs, combinations and packages are intended to be within the scope of this application. In certain implementations, methods and systems are disclosed that are capable of automatically interfacing with Internet-based social networks for safely providing a mobile user's friends with location-aware updates.

Figure 1:
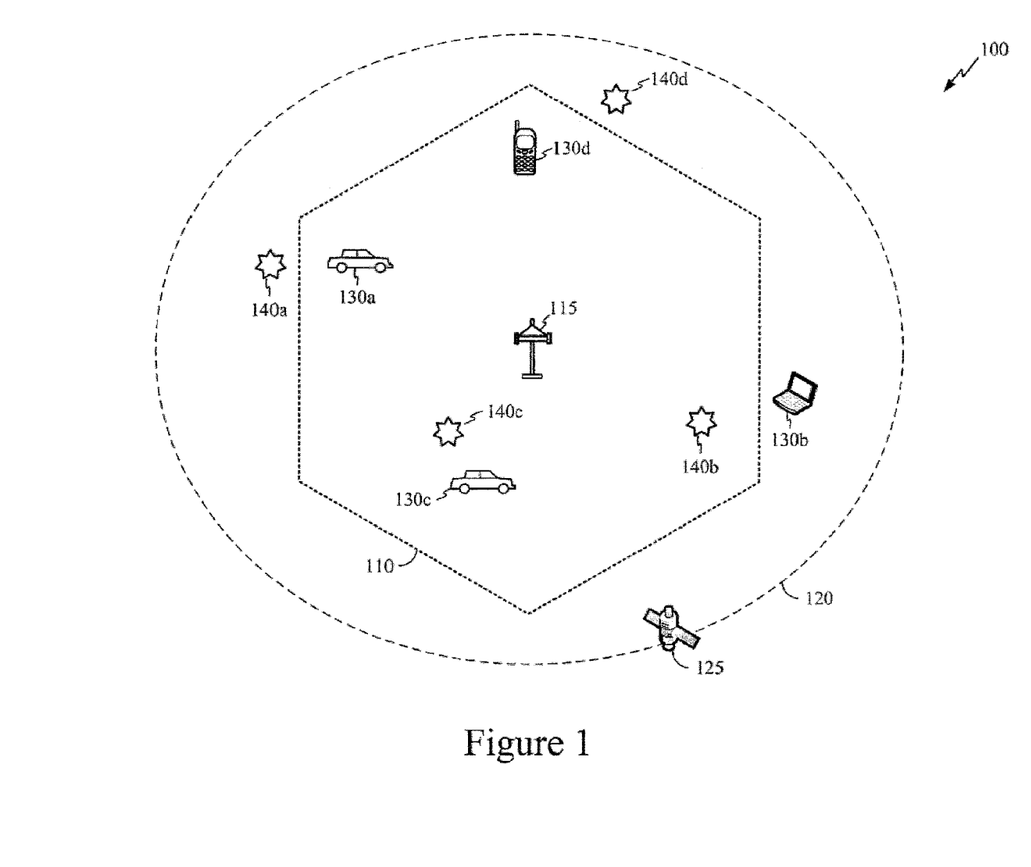
FIG. 1 illustrates one example of a high-level mobile users' operating environment according to certain implementations of the invention.

FIG. 1 illustrates one example of a high-level mobile users' operating environment 100. As shown in FIG. 1, a wireless communication system 110 includes a wireless communication hub 115. Wireless communication system 110 can be overlaid with a global positioning system (GPS) 120. Wireless communication system 110 can include any type of wireless communication protocol, standard or technology, such as IEEE 802.11 standards (WiFi), IEEE 802.16 standards (WiMAX), IS-95 standards (CDMA), ETSI Global System for Mobile Communications standards (GSM), orthogonal frequency division multiplexing standards (OFDM), single carrier frequency division multiple access standards (SC-FDMA), high-speed downlink packet access standards (HS-DPA), 3GPP Long Term Evolution standards (LTE), and the like. Wireless communication system 110 generally includes a broadcast center 115 (e.g., transmission station, base station, access point, etc.), which can be used to facilitate wireless communication with mobiles devices. Broadcast center 115 can also include a wired or wireless connection to the Internet. Operating environment 100 also includes a global positioning system (GPS) 120, which has one or more GPS satellites 125 associated with it. In certain implementations, it is possible for system 110 to also perform the functions of GPS 120, or vice versa.

Environment 100 shows four possible mobile users, each with a mobile device, 130*a-d*. In this illustration, there are two mobile users in automobiles, 130*a*, 130*c*, one mobile user with a laptop computer, 130*b*, and one mobile use on a handheld device 130*d*. While the focus of this disclosure will be on mobile users in automobiles, 130*a*, 130*c*, it will become apparent to those skilled in the art that certain embodiments are equally applicable to a mobile user with a laptop computer 130*b*, a mobile user with a handheld device 130*d*, or any other mobile device having the functionalities, or access to the functionalities, described within this application.

Along with mobile users, environment 100 also illustrates four points of interest (POIs) 140*a-d*. For purposes of this disclosure, a point of interest (POI) is meant to include all types of natural items (mountains, bodies of water, forests, deserts, topographical features, etc.), all types of man-made items (streets, intersections, buildings, airports, bridges, lakes, etc.), all types of system-loaded items (weather information, traffic delays, emergency actions, etc.) and all types of user-loaded items (geo-cache coordinates, home location, friend contact information, pre-loaded tweets, etc.). In certain implementations, the mobile user's device or system, e.g., a car, is capable of using environment 100 knowledge, based on location-aware sub-systems interacting with GPS 120 and having knowledge of POIs, to automatically provide updates relating to POIs and/or the user's location to one or more social networks over wireless communication system 110. A social network may be an online system for building and maintaining relationships between users of the online system, which may include a website that provides users with access to the features and functionality of the online system.

Figure 2:
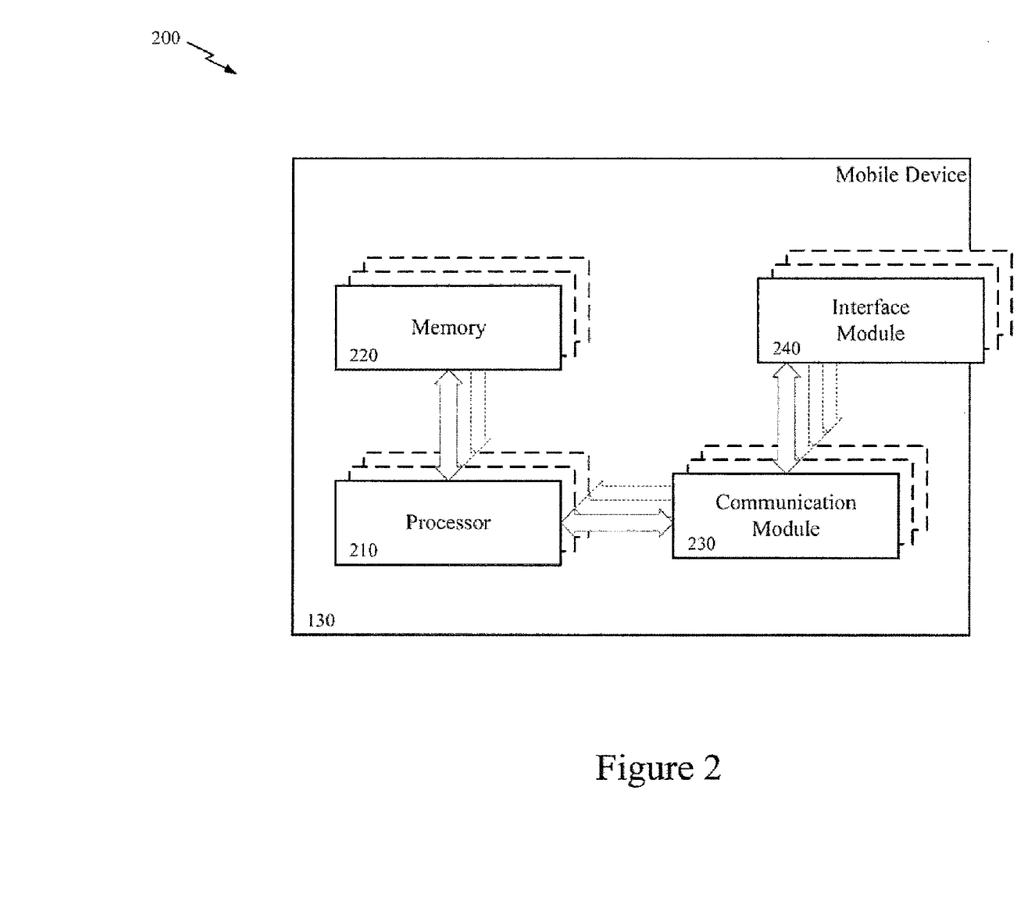
FIG. 2 illustrates one example of a hardware block diagram for a mobile user's mobile device according to certain implementations of the invention.

FIG. 2 illustrates one example of a hardware block diagram 200 for a mobile user's mobile device 130. As shown in FIG. 2, mobile device 130 can generally include one or more processors 210, which may be coupled to one or more memories 220. In certain implementations, processor 210 may incorporate memory 220, and/or memory 220 may include internal and/or external memories, which may be fixed and/or removable. Processor 210 may also be coupled to one or more communication modules 230. In certain implementations, the functions of communication module 230 may be software included in memory 220, which can be executed on processor 210, which may make communication module 230 unnecessary.

Mobile device 130 can also include one or more interface modules 240, which can be coupled to communication module 230. In certain implementations, interface module 240 may include means for facilitating wired or wireless communication with external devices, such as a base station, access point or router, which may provide access to the Internet and/or GPS support. These means for facilitating wired or wireless communication with external devices, known in the art, can include modems, radios, antennae, and the like (not shown). In certain implementations, interface module 240 may include means for interaction between a mobile user and mobile device 130, such as a keyboard, display, microphone, speaker, and/or touch-screen (not shown).

Figure 3:
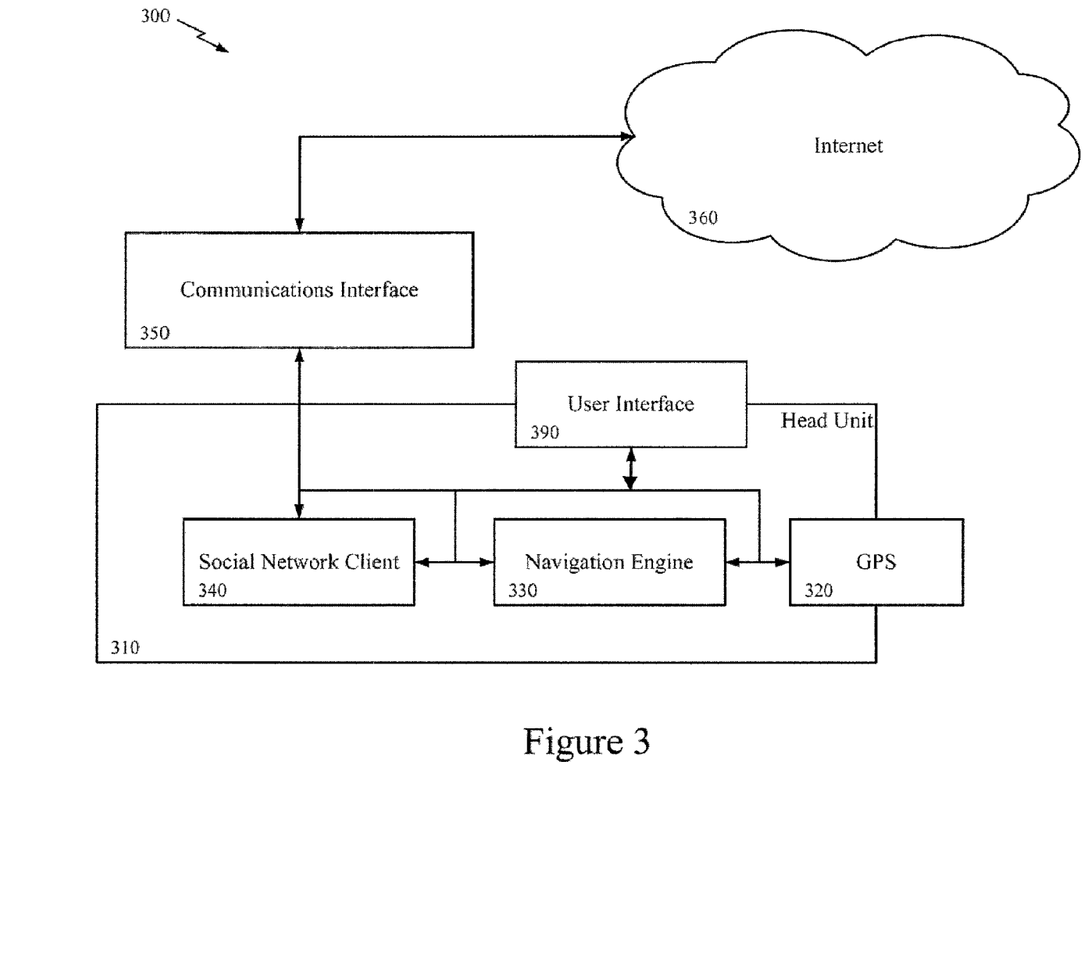
FIG. 3 illustrates one example of a functional block diagram for an automobile infotainment system according to certain implementations of the invention.

FIG. 3 illustrates one example of a functional block diagram 300 for an automobile infotainment system. As previously stated, certain implementations described in this application are presented using an automobile or car for illustrative purposes only and are not meant to limit the scope of the appended claims.

As shown in FIG. 3, a car head unit 310 can include a GPS 320 (the physical radio and antenna for which may be exterior to head unit 310), a navigation engine 330 and a social network client module 340. In certain implementations, one or all of these head unit 310 sub-systems may be located outside of head unit 310, which may simply take inputs from the sub-systems' outputs and process them for subsequent transmission. As seen in this example, navigation engine 330, social network client module 340 and GPS 320 are coupled together for communication in the head unit 310 for a vehicle. GPS 320 can provide real-time, or periodic real-time, location information to navigation engine 330. The navigation engine 330, in this example, receives location information that is automatically updated by GPS 320 as the mobile user travels in a vehicle. At navigation engine 330, the location information can be reverse geo-coded, such that, for example, a street address is produced.

In certain implementations, navigation engine 330 can also use the location information to associate the user's location with one or more points of interest (POIs). Navigation engine 330 can then provide social network client 340 with the location information, and/or the reverse geo-coded data, and/or the associated POIs. Navigation engine 330 might also provide social network client 340 with other navigation-related information, such as, routing information, departure time, estimated arrival time, current location, destination, average speed, distance traveled, and the like.

Social network client 340 receives data from navigation engine 330, processes that data for content and form, and passes the resultant social media update(s) to a communications interface 350. In certain implementations, the user can pre-program update preferences, including whether to update at all, into head unit via a system interface, such as user interface 390. Additional pre-programmed user data can include social network login information, which types of data to use for updates and/or when updates are to be attempted. In general, user data can control all aspects of where, when, what and how updates are made to social networks.

In certain implementations, user interface 390 might be buttons, knobs, switches and displays (not shown) that are physically located on head unit 310. User interface may also include connectors and/or wireless interfaces for coupling an external user interface to head unit 310. For example, using either Bluetooth™ or a USB cable, the user may connect a smart phone (e.g., Blackberry™, iPhone™, etc.) to head unit 310, thus being able to use the smart phone to enter user data regarding social network updates.

Social network client 340 may include user-specific and/or system default filters and/or privacy policies to use for processing the navigation data for content. For example, a user-specific filter may prevent route information provided to social network client 340 from navigation engine 330 from being included in a post to a particular social network, or to all posts to all social networks. Social network client 340 may include social network posting rules, regulations and policies for processing the navigation data for form, which can be included as system default filters and/or privacy policies. For example, Twitter™ requires that all tweets be no greater than 140 characters in length. In certain implementations, social network client 340 can process for more than one social network at a time, possibly using different content and form processing filters and policies for each social network, as needed, required or desired.

Since social network client 340 can provide a gating function for any or all information that navigation engine 330 provides to it, the privacy of the user can be as protected as the user decides. The liberalness or strictness of the filter and privacy policies can be decided by the user, thus ensuring that the location data of the user is not posted anywhere without the user having decided to do so.

Filter and privacy policies are the user settings that can vary from the user to user. For example, the user can set a filter such as "Prompt me before sending status update to Twitter™", which will provide the user with full control over which tweets go out to Twitter™. On the other hand the user may decide to make all updates completely automatic, either using pre-programmed user data, system default data or a combination of both, thus giving full control of any or all social network updates via social network client 340.

As previously discussed, social network client 340 passes the post-processed updates to communications interface 350. As shown in FIG. 3, communications interface 350 can be external to head unit 310. However, in certain embodiments, it may be integrated into head unit 310, either complete, or in part. Any wireless communication means known in the art that is capable of ultimately providing a connection to the Internet can be used for communications interface 350. Such communication means may include: WiFi, WiMAX, CDMA, GSM, OFDM, LTE, and the like, via a coupled smart phone, laptop, smartbook, car phone, and the like. The specific implementation of communication means should ensure at least occasional connectivity between social network client 340 and one or more intended or targeted social networks on the Internet 360.

Although certain implementations are described in this application terms of a user's system posting location-aware updates to one or more social networking websites, it should be understood that such a system could easily be extended to included sending SMS messages, voicemails or emails, with text, audio and/or video. The scope of this disclosure is meant to include such extensions, and others that may only require access for providing data, in this case location-aware data as described herein, to the Internet.

Figure 4:
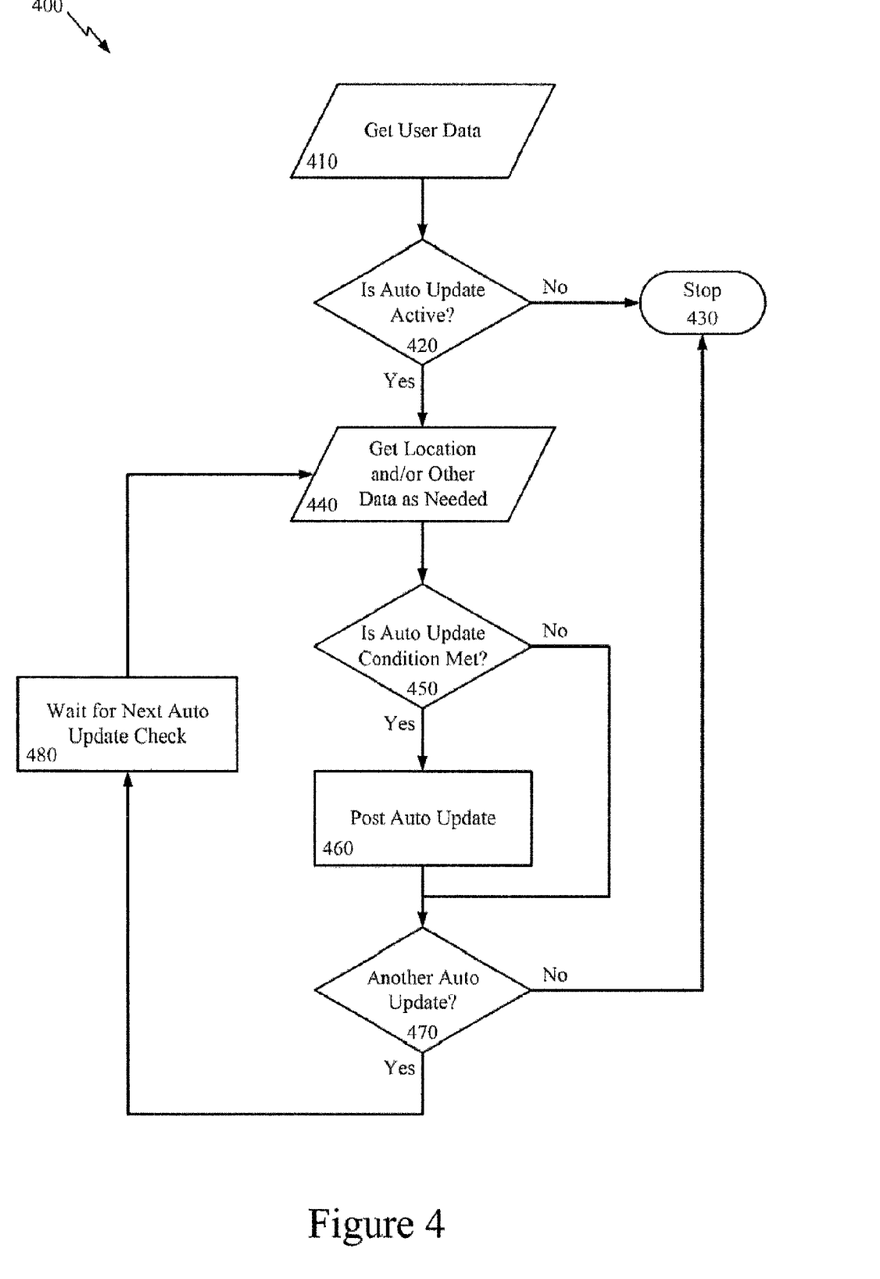
FIG. 4 illustrates one example of an auto update flow diagram for location-aware social networking according to certain implementations of the invention.

FIG. 4 illustrates one example of an auto update flow diagram 400 for location-aware social networking. The auto updates provide messages that are automatically transmitted for receipt and posting at receiving systems such as social networks. Location updates having location information may be provided as auto updates. As such, user location information may be automatically transmitted to receiving systems such as social networks while a user is in transit.

At step 410, the flow gets user data, which can be accomplished using interface module 240 having the functionality of user interface 390. The user data can include whether an auto update (e.g., location update) is to be made at all, along with additional pre-programmed user preferences (discussed further, below). At step 420, after getting the user data, a check can be made whether the user data has made the auto update active by checking a user programmed auto update indicator. For location updates, a location update indicator may be checked for activation. If the auto update function is not active, then the auto update flow will proceed to step 430 and stop. However, if the auto update function has been activated, then the flow proceeds to step 440.

At step 440, location data (and possibly other data) is retrieved. For example, GPS 320 can receive a GPS signal (e.g., via interface module 240 and communication module 230), which when a mobile user is moving may be continually or periodically updated, and translates that signal into a message for processor 210 of the navigation engine 330. The translated GPS signal might represent a longitude and latitude or some other geospecific identifier. In certain implementations, instead of a translated GPS signal, a user may manually enter a longitude and latitude via the functions of user interface 390 built into GPS 320 and/or head unit 310. GPS 320 then passes the information to navigation engine 330.

At step 440, other data besides location data may be retrieved. For example, social network client 340 can establish a connection with one or more social networks on the Internet 360 using communications interface 350. This connection may be part of the communications during posts or status updates, or it may be separate and distinct from that posting communication. Once social network client 340 is in communication with a social network via communications interface 350, it can obtain friend data, including friend location data, from the social network. The friend data can be any data normally available to the mobile user about their friends on that, or any, particular social network. Social network client 340 can then process the friend data for content and form. The processed friend data is then provided to navigation engine 330. Navigation engine 330 can then incorporate the processed friend data into the location data. For instance, the navigation engine 330 may correlate friend location data with the location information associated with the mobile user. In certain implementations, navigation engine 330 can use the processed friend data, including friend location data, when performing normal navigation system functions (not shown). For example, if friend data were to include friend location data such as a nearby location or address of a friend, then navigation engine 330 could insert a friend icon (identifying a friend location relative to the mobile user), onto the navigation map display (not shown) indicating to the mobile user that a friend is nearby.

After getting the location (and other) data, at step 450, a check is made to see whether an auto update condition is met. If a condition is met, then an auto update post is made at step 460, followed by a check at step 470 to see whether another auto update will be made, or is expected to be made based at least in part on the user data. Information relating to the location of one or more friends or POIs may be provided in the auto update (e.g., location update) that is posted. If no auto update condition is met, then an auto update post is not made, and the check at step 470 is made.

At step 450, navigation engine 330 receives the location (and other) data provided to it by GPS 320 and correlates that location information with navigation information and/or data. For instance, navigation engine 330 may correlate the location received information to the GPS 320 with navigation information to create correlated navigation-to-location data. In certain implementations, navigation engine 330 can use map and travel data to correlate POIs and travel statistics to GPS 320 location information. Navigation engine can also correlate the location of friends provided to it by social network client 340 to GPS 320 location information. The navigation engine 330 accesses POI information and compares the location information for the mobile user with the locations of the POIs. In this way, for example, navigation engine 330 can identify POIs to which the mobile user is within a preselected distance from a mobile user, and/or can identify one or more friends to which the mobile user is near or soon will be near. Navigation engine 330 can also calculate the travel time to reach certain POIs and/or friend locations from the location of the mobile user, as well as the time remaining to reach the programmed trip destinations, and other navigation statistics. Navigation engine 330 passes the correlated navigation-to-location data to social network client 340 for processing.

Using this correlated navigation-to-location data, a check can be made against the user data to determine if an auto update, such as a location update, should be posted. For example, if the user data desires an auto update to be posted when the user is within 10 minutes from the final trip destination, then the correlated navigation-to-location data can be used to make that determination. Or, perhaps the user would like to make an auto update post every time the user passes a particular type of POI or friend. The correlated navigation-to-location data can be used to make that determination also. Virtually any combination of time-dependent and/or location-dependent statistic might be designated by the user as the condition for posting an auto update. In this way, the user can pre-determine and/or pre-condition when and/or where to post auto updates.

As previously discussed, if the auto update condition is met, then an auto update is posted. Social network client 340 processes the received navigation data for content and form. In certain implementations, the content and form processing converts the navigation data to one or more posts for one or more social networks according to the posting rules and regulations of the social networks and/or according to the user data retrieved at step 410 (e.g., posting filters and/or privacy options of the mobile user). Social network client 340 provides the processed data to communications interface 350. Communications interface 350 can communicate the processed data, or posts, status updates, etc., to the target or intended one or more social networks via Internet 360. In certain implementations, and without limitation, the processed data can include things like where the mobile user is going and from where the mobile user departed. It may include things like nearby POIs or soon-to-be nearby POIs. It may include navigation data and trip statistics, like time to final destination or elapsed time of trip. These are just examples of auto update posts and are not meant to limit the scope of the appended claims.

If, at step 470, no additional posts are to be made, then the flow proceeds to step 430 and stops. In certain implementations, a user may only want to post one auto update when within a certain distance or time of the final trip destination. After this post is made, then there will be no other posts and the flow can stop. If, however, the user wants to post an auto update at every POI along the journey, then navigation engine 330 will be able to know whether there are any more POIs along the trip, and when no other POIs exist along the trip, then no other posts will be made and the flow can stop.

If, at step 470, there are additional posts to be made, then the flow proceeds to stop 480 where it can wait for the next auto update check. This waiting can be time-based (e.g., from 0 to some number of seconds or minutes, etc.), it may be distance-based (e.g., check every 1 to some number of feet or miles, etc.), or it may have some other basis (e.g., check at every passed POI along the trip). Whatever the auto update check frequency, when a check needs to be made, the flow passes back to step 440 to get location (and other) data, and then continues from there as previous discussed.

While the flow has been discussed in terms of the functional blocks of FIG. 15, it should be understood that the flow can be implemented in software and stored in memory 220 and executed on processor 210, with external communications being handled by communication module 230 via interface module 240.

Figure 5A:
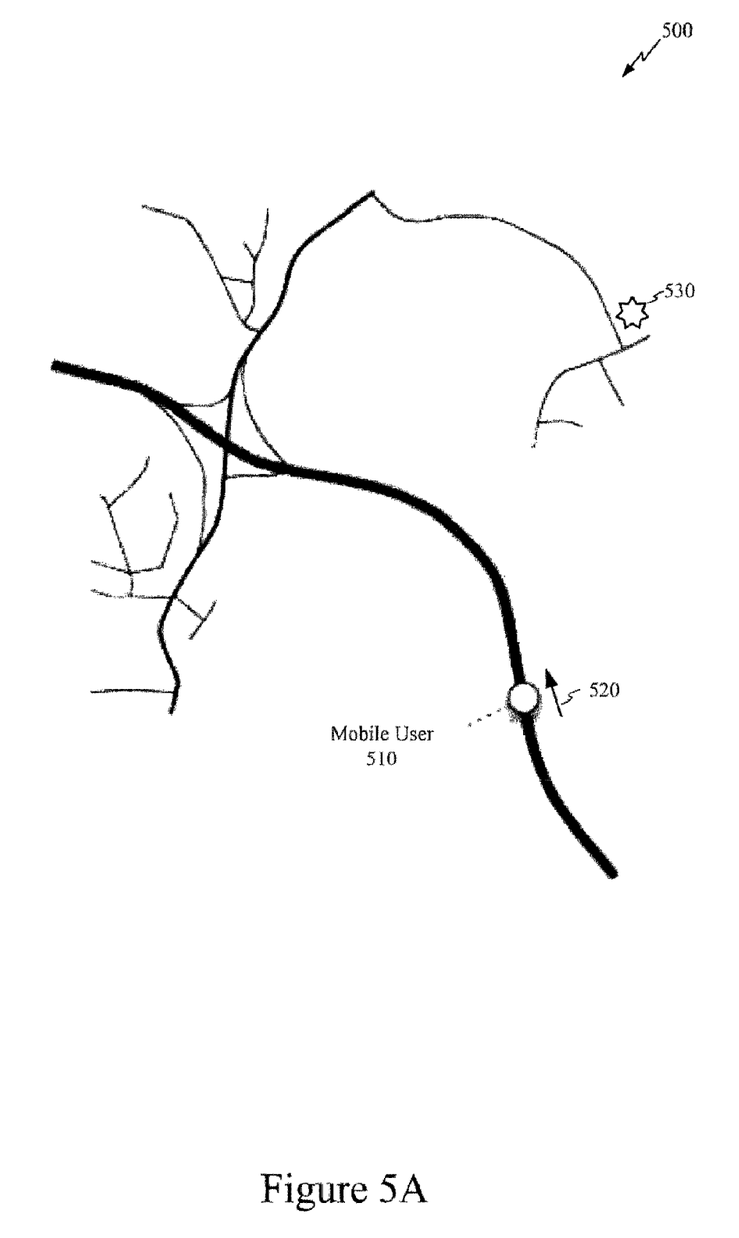
FIGS. 5A-5C illustrate one example of a usage scenario according to certain implementations of the invention.
Figure 5B:
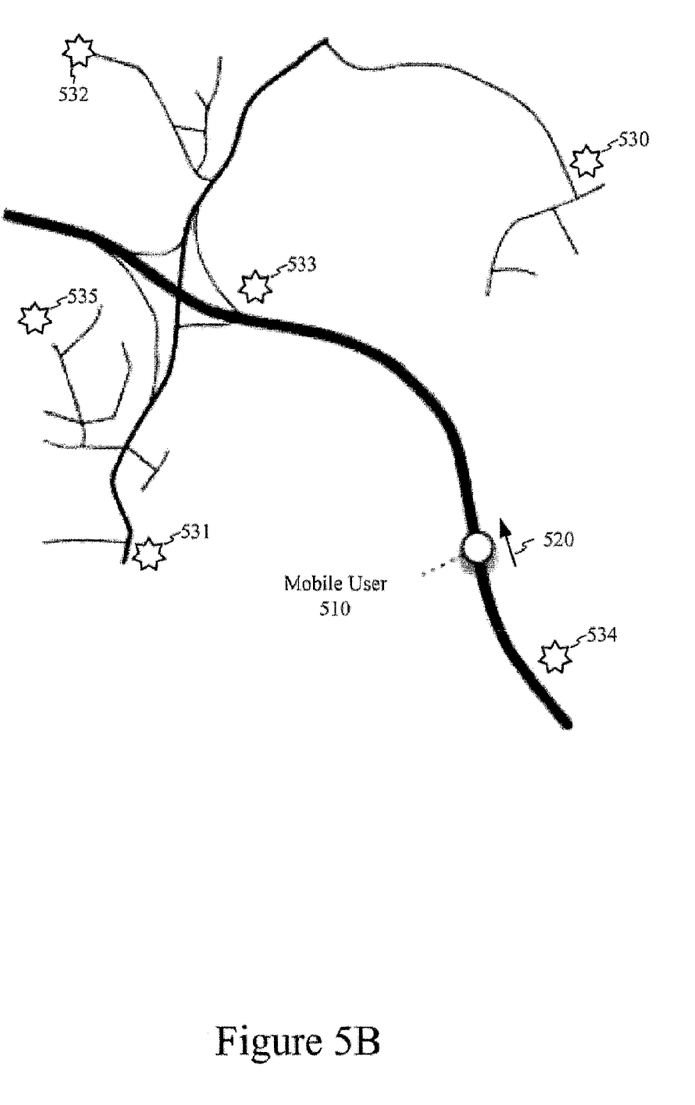
Figure 5C:
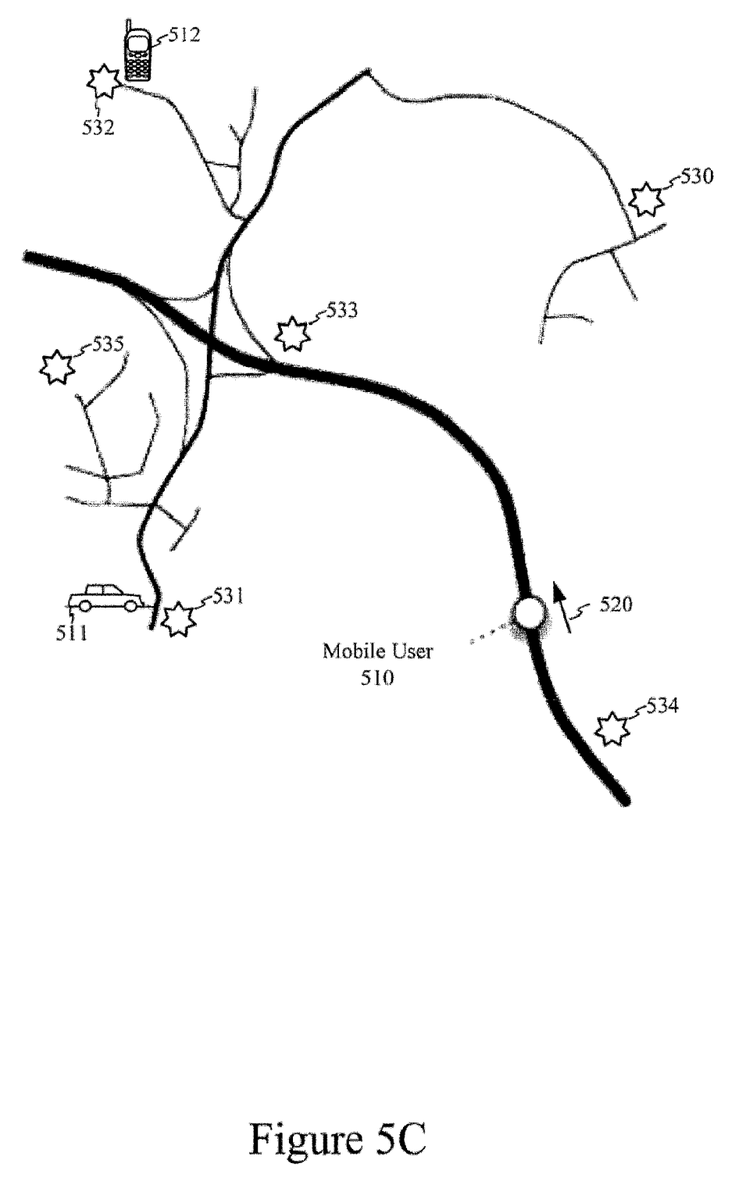

FIGS. 5A-5C illustrate one example of a usage scenario. FIG. 5A shows a limited street map 500, on which there is shown a single mobile user 510, who for this example it traveling in a car from some unknown origin off of this map in a travel direction 520 shown. Also for this example, mobile user 510 is traveling to POI 530, for which there is only one route available (only traveling on the illustrated roads). It is presumed that mobile user 510 has a location-aware, social networking system according to the invention.

The system of mobile user 510, via the location-aware, social networking system, can post an auto update to a social network, such as "headed to POI 530, 20 minutes until arrival." Or, the system of mobile user 510 could post multiple auto updates to multiple social networks, each or all of which might include one or more of mobile user's longitude and latitude, speed, origin, time traveled, time to go to destination, average or actual speed, route taken, route to go, road currently traveling, direction headed, and the like. The determination of to which social networks and when/how/where to post an auto update was pre-programmed into mobile user's system at a time prior to the start of this current trip.

FIG. 5B shows the map of FIG. 5A, with additional POIs 531-535 also shown. As illustrated, mobile user 510 has recently passed POI 534 and POI 533 is in route to where mobile user 510 is headed, to POI 530. POIs 510, 532 and 535 do not appear to be in route to the destination, but are visible on the map view and known to the location-aware, social networking system. In certain implementations, and depending on the pre-programmed user data, the system of mobile user 510 can now post an auto update to a social network, such as "headed to POI 530, 20 minutes until arrival, passing by POI 533 in 5 minutes." Or, the system of mobile user 510 could post multiple auto updates to multiple social networks, each or all of which might include one or more of any or all information about the POIs 530-535 currently within the map view of mobile user 510, with or without correlation with mobile user 510 data.

FIG. 5C shows the map of FIG. 5B, with the addition of two friends 511-512 of mobile user 510. As illustrated, friend 511 is at or near POI 531, and friend 512 is at or near POI 532. In certain implementations, and depending on the pre-programmed user data, the system of mobile user 510 can now post an auto update to a social network, such as "headed to POI 530, passing by POI 533 in 5 minutes, possible detour to POI 532 to see friend 512." Or, the system of mobile user 510 could post multiple updates to multiple social networks, each or all of which might include one or more of any or all information about the friends 511-512 alone or together, and with or without correlation with mobile user 510 data and/or POIs 530-535, all of which being currently within the map view of mobile user 510.

While the location-aware social networking has been described in detail and with reference to certain implementations thereof, it will be apparent to those skilled in the art that various changes and modifications can be made without departing from the spirit and scope of this application. Thus, it is intended that the scope of coverage includes these modifications and variations, provided they come within the scope of the appended claims and their equivalents.

What is claimed is:

1. A method, comprising:
 while a vehicle is travelling to a point of interest along a route,
  receiving, at a processor of a head unit of the vehicle, location information from a navigation engine including navigation information corresponding to the route;
  receiving, at the processor, user data including a location update activation indicator and one or more location update conditions, the one or more location update conditions including at least one of a correlated navigation-to-location time-dependent statistic and a correlated navigation-to-location location-dependent statistic;
  determining, by the processor, that the location update activation indicator is active;

obtaining, by the processor, real-time or periodic real-time location information associated with a location of the vehicle including a current location of the vehicle on the route relative to the point of interest;

determining, by the processor, that at least one location update condition is met by determining whether the real-time or periodic real-time location information of the vehicle meets at least one of the correlated navigation-to-location time-dependent statistic and the correlated navigation-to-location location-dependent statistic; and automatically posting, by the processor, a location update to a social network if at least one location update condition is met, the location update including the current location of the vehicle on the route relative to the point of interest.

2. The method of claim 1, further comprising establishing a wireless Internet communication link without user interaction and automatically posting the location update to the social network via the wireless communication link.

3. The method of claim 2, further comprising automatically updating, by the processor, the location information as the vehicle travels.

4. The method of claim 1, where the obtaining real-time or periodic real-time location information comprises receiving real-time or periodic real-time location information from a Global Positioning System (GPS).

5. The method of claim 4, further comprising correlating the location information received from the GPS with the navigation information to create correlated navigation-to-location data.

6. The method of claim 5, where the determining that the at least one location update condition is met further comprises performing a check using the correlated navigation-to-location data against the user data to determine if the location update should be posted.

7. The method of claim 1, further comprising establishing a connection with at least one social network and obtaining friend data, including friend location data, from the social network.

8. The method of claim 7, further comprising correlating the friend location data with the location information associated with the vehicle.

9. The method of claim 8, further comprising calculating a travel time to reach a friend location from the location of the vehicle.

10. The method of claim 8, further comprising displaying a friend location relative to the location of the vehicle on a navigation display map.

11. The method of claim 8, further comprising providing information relating to a location of one or more friends in the location update that is posted.

12. The method of claim 1, further comprising:
accessing point of interest location information; and
comparing the location information, associated with the current location of the vehicle, with respective locations of one or more points of interest.

13. The method of claim 12, further comprising:
identifying points of interest within a pre-selected distance from the location of the vehicle; and
calculating a travel time to reach one or more of the identified points of interest from the location of the vehicle.

14. The method of claim 12, further comprising providing information relating to the location of one or more points of interest in the location update that is posted.

15. The method of claim 1, further comprising using at least one of:

a user-specific filter;
a system default filter; and
privacy policies to prevent posting of the location information under predetermined conditions, the privacy policies including a different privacy policy for different social networks.

16. The method of claim 1, where determining, by the processor, that at least one location update condition is met comprises determining that the vehicle is within one or more of a threshold time and a threshold distance from the point of interest, the method comprising automatically posting, by the processor, the location update to the social network responsive to the vehicle being within one or more of the threshold time and the threshold distance of the point of interest.

17. The method of claim 1, where the location update is a first location update, where the at least one location update condition is a first location update condition, and where the method further comprises:
determining that a second location update is expected based at least in part on the user data;
waiting for a next location update check;
determining that a second location update condition is met; and
automatically posting the second location update to the social network.

18. A system for automatically posting user-location information to a social network, comprising:
a system interface for receiving user data, the user data including a location update activation indicator and one or more location update conditions;
a head unit of a vehicle, including:
a navigation engine configured to obtain information associated with a location of the vehicle including correlated navigation-to-location data indicating a location of the vehicle relative to a point of interest along a route of vehicle travel; and
a social network client coupled with the navigation engine, the social network client configured to determine that the location update activation indicator is active and to determine that at least one location update condition is met based on the correlated navigation-to-location data against the user data; and
a communications interface coupled with the social network client and the navigation engine, the communications interface configured to automatically post a location update to the social network if the social network client determines that the at least one location update condition is met, the location update including a human-readable text-based message indicating a location of the vehicle relative to at least one point of interest.

19. The system of claim 18, where the communications interface is configured to establish a wireless Internet communication link without user interaction such that the location update is automatically posted to the social network via the wireless link.

20. The system of claim 19, where the navigation engine is configured to receive location information that is automatically updated as the vehicle travels.

21. The system of claim 18, where the navigation engine is coupled with a Global Positioning System (GPS) such that the navigation engine receives real-time or periodic real-time location information from the GPS.

22. The system of claim 21, where the navigation engine correlates the location information received from the GPS with navigation information to create the correlated navigation-to-location data.

23. The system of claim 22, where the social network client receives the correlated navigation-to-location data from the navigation engine, and where the social network client determines if the location update should be posted based on the correlated navigation-to-location data.

24. The system of claim 18, where the social network client establishes a connection with at least one social network to obtain friend data, including friend location data, from the social network.

25. The system of claim 24, where the navigation engine correlates the friend location data with the location information associated with the vehicle.

26. The system of claim 25, where the navigation engine calculates a travel time to reach a friend location from the location of the vehicle.

27. The system of claim 25, further comprising a navigation map display configured to display a friend location relative to the location of the vehicle.

28. The system of claim 25, where information relating to a location of one or more friends is provided in the location update that is posted.

29. The system of claim 18, where the navigation engine is configured to access point of interest location information and compares the location information that is associated with the location of the vehicle with a location of one or more points of interest.

30. The system of claim 29, where the navigation engine is configured to identify points of interest within a pre-selected distance from the location of the vehicle and to calculate a travel time to reach one or more of the identified points of interest from the location of the vehicle.

31. The system of claim 29, where information relating to the location of one or more points of interest is provided in the location update that is posted.

32. The system of claim 18, further where the social network client uses at least one of:
a user-specific filter;
a system default filter; and
privacy policies to prevent posting of location information under predetermined conditions.

33. The system of claim 18, where the at least one location update condition includes at least one of:
a correlated navigation-to-location time-dependent statistic; and
a correlated navigation-to-location location-dependent statistic.

34. A head unit of a vehicle, comprising:
a system interface for receiving user data, the user data including a location update activation indicator and one or more location update conditions;
a navigation engine configured to obtain information associated with a location of the vehicle including correlated navigation-to-location data indicating a location of the vehicle relative to a point of interest along a route of vehicle travel; and
a social network client coupled with the navigation engine, the social network client configured to determine that the location update activation indicator is active and to determine that at least one location update condition is met based on the correlated navigation-to-location data against the user data; and
a communications interface coupled with the social network client and the navigation engine, the communications interface configured to automatically post a location update to the social network if the social network client determines that at least one location update condition is met, the location update including a human-readable text-based message indicating one or more of a distance between the vehicle and at least one point of interest and an estimated time for the vehicle to reach at least one point of interest.

* * * * *